United States Patent
Inoue

(10) Patent No.: US 12,188,881 B2
(45) Date of Patent: Jan. 7, 2025

(54) OBSERVATION SIGNAL GENERATION DEVICE, OBSERVATION DEVICE, OBSERVATION SIGNAL GENERATION METHOD, AND OBSERVATION METHOD

(71) Applicant: Furuno Electric Co., Ltd., Hyogo (JP)

(72) Inventor: Shuhei Inoue, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 491 days.

(21) Appl. No.: 17/453,133

(22) Filed: Nov. 1, 2021

(65) Prior Publication Data
US 2022/0050065 A1   Feb. 17, 2022

Related U.S. Application Data

(63) Continuation of application No. PCT/JP2020/016416, filed on Apr. 14, 2020.

(30) Foreign Application Priority Data

May 14, 2019   (JP) .................................. 2019-091265

(51) Int. Cl.
*G01N 22/04*   (2006.01)
*G01W 1/00*   (2006.01)

(52) U.S. Cl.
CPC .............. *G01N 22/04* (2013.01); *G01W 1/00* (2013.01)

(58) Field of Classification Search
CPC ..... G01W 1/00; G01W 2201/00; G01N 22/04
See application file for complete search history.

(56) References Cited

U.S. PATENT DOCUMENTS 5,396,520 A * 3/1995 Degges ..................... H04B 1/16
375/345
5,526,676 A * 6/1996 Solheim .................. G01W 1/08
73/170.27

(Continued)

FOREIGN PATENT DOCUMENTS

JP   H02280083 A   11/1990
JP   H0697847 A   4/1994

(Continued)

OTHER PUBLICATIONS

Machine translation of WO 2007013302 (Year: 2007).*

(Continued)

*Primary Examiner* — Nathaniel J Kolb
(74) *Attorney, Agent, or Firm* — Alleman Hall & Tuttle LLP

(57) ABSTRACT

An observation signal generation device includes a local signal generator, a first mixer which mixes an RF signal to be observed with the local signal and outputs a first IF signal, a second mixer which mixes the RF signal and the local signal and outputs a second IF signal, an first IF filter which includes a first intermediate frequency obtained by subtracting a frequency of the local signal from a first frequency of the RF signal in a passband, includes a second intermediate frequency obtained by subtracting a frequency of the RF signal from the frequency of the local signal in an attenuation band, and filters the first IF signal to generate a first observation signal, and an second IF filter includes the first intermediate frequency in the attenuation band and the second intermediate frequency in the passband, and filters the second IF signal to generate a second observation signal.

18 Claims, 12 Drawing Sheets

(56) References Cited

U.S. PATENT DOCUMENTS

| | | | |
|---|---|---|---|
| 6,427,068 B1 * | 7/2002 | Suominen | H03D 7/165 |
| | | | 455/150.1 |
| 8,742,768 B1 | 6/2014 | Pelletier et al. | |
| 9,413,402 B1 * | 8/2016 | Mayer | H03D 1/04 |
| 2005/0162307 A1 | 7/2005 | Kato | |
| 2008/0144595 A1 | 6/2008 | Nara | |
| 2010/0259245 A1 | 10/2010 | Kunie et al. | |
| 2010/0265116 A1 | 10/2010 | Kasperkovitz et al. | |
| 2012/0045023 A1 | 2/2012 | Casagrande | |
| 2013/0024150 A1 | 1/2013 | Erb | |
| 2016/0125586 A1 * | 5/2016 | Keller | A01N 25/00 |
| | | | 382/103 |

FOREIGN PATENT DOCUMENTS

| | | | | |
|---|---|---|---|---|
| JP | H11264736 A | 9/1999 | | |
| JP | 2005073097 A | 3/2005 | | |
| JP | 2005207888 A | 8/2005 | | |
| JP | 2006121546 A | 5/2006 | | |
| JP | 2008216194 A | 9/2008 | | |
| JP | 2011109518 A | 6/2011 | | |
| JP | 2013224884 A | 10/2013 | | |
| JP | 2018194344 A | 12/2018 | | |
| KR | 20110107493 A | 10/2011 | | |
| KR | 101237324 B1 | 2/2013 | | |
| WO | WO-8505188 A1 * | 11/1985 | | |
| WO | WO-2007013302 A1 * | 2/2007 | | G01R 23/173 |
| WO | 2017018061 A1 | 2/2017 | | |

OTHER PUBLICATIONS

Tian, L. et al., "Development of RF frequency synthesizers for MB-OFDM ultra-wideband (UWB) systems," Acta Electronica Sinica, vol. 35, No. 10, Oct. 25, 2007, 5 pages.

Psychogiou, D. et al., "RF Wide-Band Bandpass Filter With Dynamic In-Band Multi-Interference Suppression Capability," IEEE Transactions on Circuits and Systems II: Express Briefs, vol. 65, No. 7, Jul. 12, 2017, 5 pages.

ISA Japan Patent Office, International Search Report Issued in Application No. PCT/JP2020/016416, Jul. 21, 2020, WIPO, 6 pages.

European Patent Office, Supplementary European Search Report Issued in Application No. 20804887.6, May 30, 2023, Germany, 7 pages.

* cited by examiner

FIG. 3A n=5 m=10                                                                                        [GHz]

| Lo     | fLo1       | fLo2       | fLo3       | fLo4       | fLo5       |
|--------|------------|------------|------------|------------|------------|
| RF(IF1)| fLo1−fIF1  | fLo2−fIF1  | fLo3−fIF1  | fLo4−fIF1  | fLo5−fIF1  |
| RF(IF2)| fLo1+fIF2  | fLo2+fIF2  | fLo3+fIF2  | fLo4+fIF2  | fLo5+fIF2  |

FIG. 3B n=10 m=10                                                                                       [GHz]

| LoP    | fLo1       | fLo2       | fLo3       | fLo4       | fLo5       |
|--------|------------|------------|------------|------------|------------|
| RF(IF1)| fLo1−fIF1  | fLo2−fIF1  | fLo3−fIF1  | fLo4−fIF1  | fLo5−fIF1  |

| LoP    | fLo6       | fLo7       | fLo8       | fLo9       | fLo10      |
|--------|------------|------------|------------|------------|------------|
| RF(IF1)| fLo6−fIF1  | fLo7−fIF1  | fLo8−fIF1  | fLo9−fIF1  | fLo10−fIF1 |

OBSERVATION SIGNAL GENERATION DEVICE, OBSERVATION DEVICE, OBSERVATION SIGNAL GENERATION METHOD, AND OBSERVATION METHOD

CROSS-REFERENCE TO RELATED APPLICATION(S)

This application is a continuation of PCT International Application No. PCT/JP2020/016416, which was filed on Apr. 14, 2020, and which claims priority to Japanese Patent Application Ser. No. 2019-091265 filed on May 14, 2019, the entire disclosures of each of which are herein incorporated by reference for all purposes.

TECHNICAL FIELD

The present invention relates to an observation signal generation technique used for observation of a phenomenon having a frequency spectrum, such as observation of water vapor.

BACKGROUND

Conventionally, an observation device for water vapor is known.

SUMMARY

However, conventionally, it has not been easy to observe the frequency spectrum of a phenomenon such as water vapor by a simple process.

Accordingly, it is an object of the present invention to provide a technique for observing a phenomenon having a frequency spectrum, such as the observation of water vapor, by a simple process.

An observation signal generation device of the present disclosure includes, a local signal generator configured to generate a local signal; a first mixer configured to mix a radio frequency (RF) signal of an observation object having a plurality of frequency components with the local signal and output a first intermediate frequency (IF) signal; a second mixer configured to mix the RF signal and the local signal and outputting a second IF signal; a first IF filter configured to, include in a passband, a first intermediate frequency obtained by subtracting a first frequency of the plurality of frequency components of the RF signal from a frequency of the local signal, include in an attenuation band, a second intermediate frequency obtained by subtracting the frequency of the local signal from a second frequency of the plurality of frequency components of the RF signal different from the first frequency, and filter the first IF signal to generate a first observation signal; and a second IF filter configured to, include the first intermediate frequency in the attenuation band, include the second intermediate frequency in the passband, and filter the second IF signal to generate a second observation signal.

The observation signal generation device is further comprised to an RF filter configured to limit a frequency band of the RF signal.

The observation signal generation device is further comprised to an RF attenuator configured to limit an amplitude of the RF signal.

An observation device comprising each configuration of the observation signal generation device, the observation device is further comprised to a first detector configured to detect the first observation signal and output a first detection signal; a second detector configured to detect the second observation signal and outputting a second detection signal; and a processing circuitry is configured to: generate a frequency spectrum of the RF signal of the observation object from the first detection signal and the second detection signal.

The observation device is further comprised to an amplifier configured to amplify the first observation signal and the second observation signal at the same amplification factor.

The observation device is further comprised to a noise suppression filter configured to suppress a noise component of the first detection signal and the second detection signal.

In this configuration, a strength of RF signals of a plurality of frequencies having different frequencies is obtained by the local signal of one frequency.

According to the present invention, a phenomenon having a frequency spectrum such as the observation of water vapor can be observed with a simple configuration and a simple process.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein:

FIG. 3A is a table showing a relationship between a frequency of a local signal and a frequency of an RF signal whose intensity is obtained when the configuration of the present invention is used, and FIG. 3B is a table showing a relationship between the frequency of the local signal and the frequency of the RF signal whose intensity is obtained when the conventional configuration is used;

DETAILED DESCRIPTION

Figure 1:
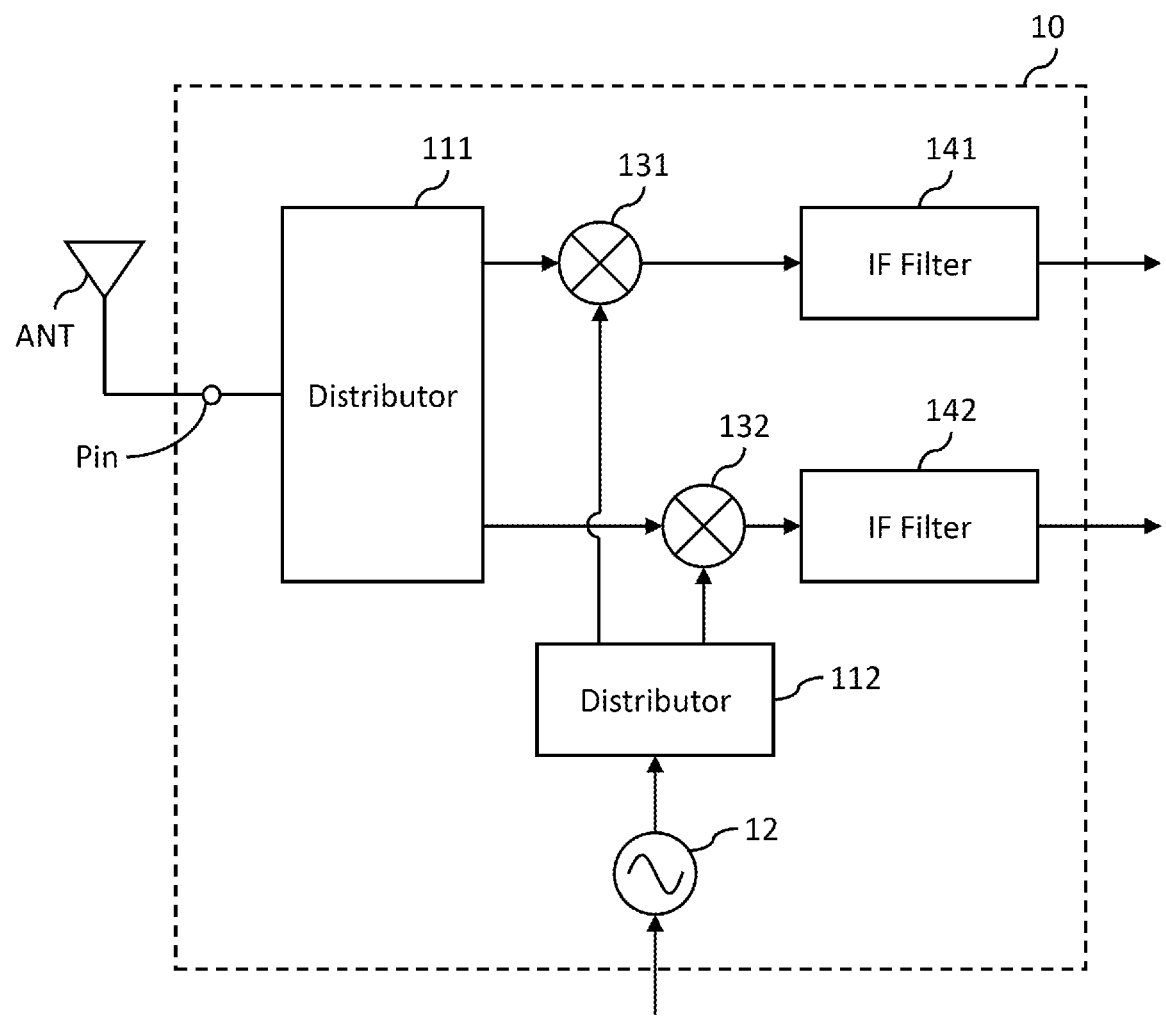
FIG. 1 is a block diagram showing a configuration of an observation signal generation device according to a first embodiment.

An observation signal generation device, an observation device, an observation signal generating method, and an observation method according to a first embodiment of the present invention will be described with reference to the drawings. FIG. 1 is a block diagram showing a configuration of an observation signal generation device according to the first embodiment. The observation signal generation device and the observation device shown in each of the following embodiments are used for observing water vapor. However, if the observation object is a phenomenon having a frequency spectrum, the observation signal generation device and the observation device according to the present embodiment can be applied.

As shown in FIG. 1, the observation signal generation device 10 includes a distributor 111, a distributor 112, a local signal generator 12, a mixer 131, a mixer 132, an intermediate frequency (IF) filter 141, and an IF filter 142. The local signal generator 12, the mixer 131, the mixer 132, the IF filter 141, and the IF filter 142 are implemented, for example, by predetermined analog electronic circuits. The mixer 131 and the mixer 132 are preferably image rejection mixers.

The mixer 131 corresponds to a "first mixer" of the present invention, and the mixer 132 corresponds to a "second mixer" of the present invention. The IF filter 141 corresponds to a "first IF filter" of the present invention, and the IF filter 142 corresponds to a "second IF filter" of the present invention. The observation signal generation device 10 has an input terminal Pin, which is connected to an antenna ANT. The input terminal Pin may be physically absent. Further, for example, a subsequent stage of the antenna ANT may be connected to a first stage low noise amplifier (LNA).

The antenna ANT has a shape capable of receiving an electromagnetic wave to be observed. The electromagnetic wave to be observed is, for example, an electromagnetic wave radiated by water vapor. The antenna ANT outputs the received electromagnetic wave of the observation object. Electromagnetic waves, or radio frequency (RF) signals, have a plurality of frequency components.

The distributor 111 is realized by, for example, a transmission circuit of an RF signal. The distributor 111 is connected to the input terminal Pin, the mixer 131, and the mixer 132. When the first stage LNA is connected to the antenna ANT, the distributor 111 is connected to the first stage LNA. The distributor 111 distributes power of an RF signal (electromagnetic wave) and outputs it to the mixer 131 and the mixer 132. In this case, the power of the RF signal output to the mixer 131 and the power of the RF signal output to the mixer 132 are the same. That is, the distributor 111 equally distributes the RF signal to the mixer 131 and the mixer 132.

The local signal generator 12 generates a local signal of a predetermined frequency based on a reference signal from a reference signal generator 60 to be described later. As an example, the frequency of the local signal is set within the frequency range of the frequency spectrum of the observation object.

The local signal generator 12 individually generates local signals of a plurality of frequencies. In other words, the local signal generator 12 generates local signals of a plurality of frequencies at different timings. The local signal generator 12 outputs a local signal to the distributor 112.

The distributor 112 is realized by, for example, a transmission circuit of an RF signal. The distributor 112 is connected to the local signal generator 12, the mixer 131, and the mixer 132. The distributor 112 distributes power of the local signal from the local signal generator 12 and outputs it to the mixer 131 and the mixer 132. In this case, the power of the local signal output to the mixer 131 and the power of the local signal output to the mixer 132 are the same. That is, the distributor 112 equally distributes the local signal to the mixer 131 and the mixer 132.

The mixer 131 mixes the RF signal and the local signal to generate a first IF signal. The mixer 131 is connected to the IF filter 141 and outputs the first IF signal to the IF filter 141.

The mixer 132 mixes the RF signal and the local signal to generate a second IF signal. The mixer 132 is connected to the IF filter 142 and outputs the second IF signal to the IF filter 142.

Figure 2:
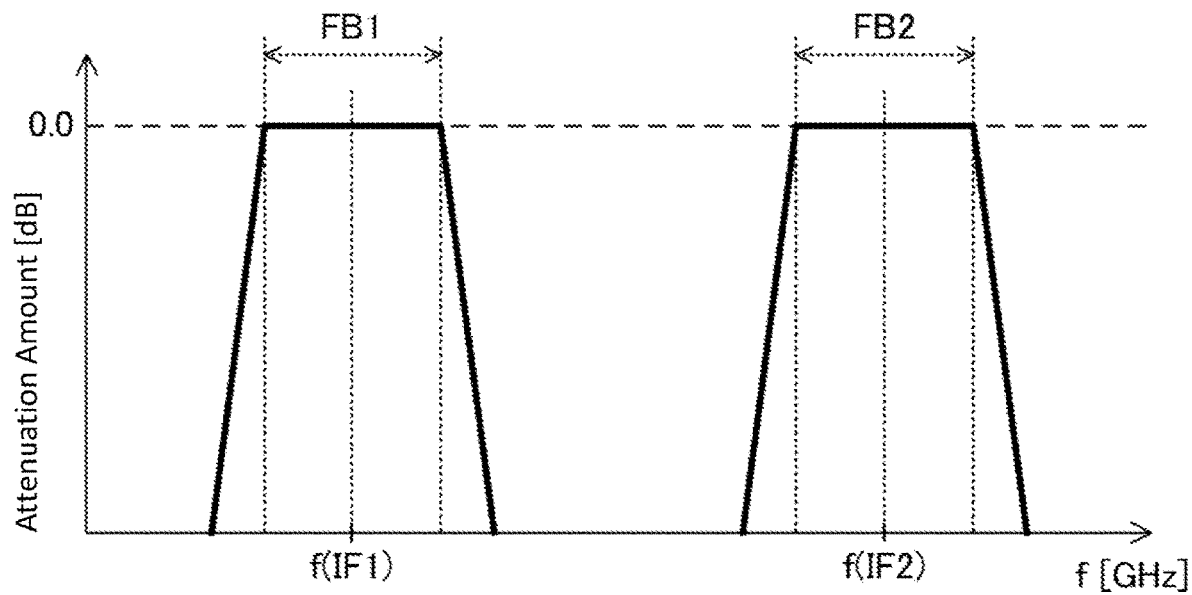
FIG. 2 is a graph showing an example of filter characteristics of an IF filter of the observation signal generation device according to the first embodiment.

FIG. 2 is a graph showing an example of filter characteristics of an IF filter of the observation signal generation device 10 according to the first embodiment.

The IF filter 141 has filter characteristics including a first intermediate frequency f(IF1) in a passband and a second intermediate frequency f(IF2) in an attenuation band. For example, as shown in FIG. 2, a center frequency of the passband of the IF filter 141 is the first intermediate frequency f(IF1). The IF filter 141 has the passband of a frequency width FB1. Here, the first intermediate frequency f(IF1) is set to a frequency obtained by subtracting the frequency of the RF signal from the frequency of the local signal.

The IF filter 141 filters the first IF signal and outputs the filtered signal as a first observation signal. Thus, a frequency of the first observation signal is a frequency within the passband of the IF filter 141, and is substantially the same as, for example, the first intermediate frequency f(IF1).

The IF filter 142 has filter characteristics including a first intermediate frequency f(IF1) in the attenuation band and a second intermediate frequency f(IF2) in the passband. For example, as shown in FIG. 2, a center frequency of the passband of the IF filter 142 is the second intermediate frequency f(IF2). The IF filter 142 has the passband of a frequency width FB2. Here, the second intermediate frequency f(IF2) is set to a frequency obtained by subtracting the frequency of the local signal from the frequency of the RF signal.

The IF filter 142 filters the second IF signal and outputs the filtered signal as a second observation signal. Thus, a frequency of the second observation signal is a frequency within the passband of the IF filter 142, and is substantially the same as, for example, the second intermediate frequency f(IF2).

In the above configuration, the observation signal generation device 10 sets the frequency of the local signal, the filter characteristic of the IF filter 141, and the filter characteristic of the IF filter 142 to a predetermined relationship. Thus, the observation signal generation device 10 can obtain observation signals corresponding to RF signals of a plurality of kinds of frequencies by using local signals of one kind of frequency. The observation signal generation device 10 obtains a plurality of observation signals corresponding to the frequency spectrum of the RF signal, that is, the frequency spectrum of the electromagnetic wave to be observed, by using local signals of a plurality of kinds of frequencies. Specifically, the observation signal generation device 10 obtains a plurality of observation signals according to the frequency spectrum of the RF signal by the following processing.

FIG. 3A is a table showing a relationship between the frequency of the local signal and the frequency of the RF signal whose intensity is obtained when the configuration of the present invention is used. FIG. 3B is a table showing a relationship between the frequency of the local signal and the frequency of the RF signal for which the intensity is obtained when the conventional configuration is used.

Figure 4A:
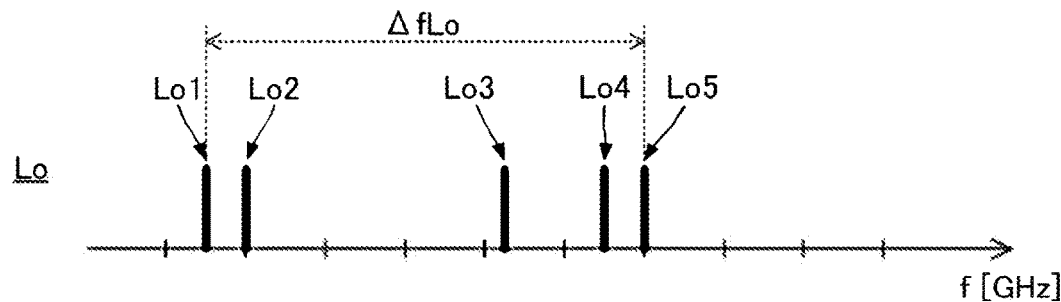
FIG. 4A shows a frequency distribution of the local signal.
Figure 4B:
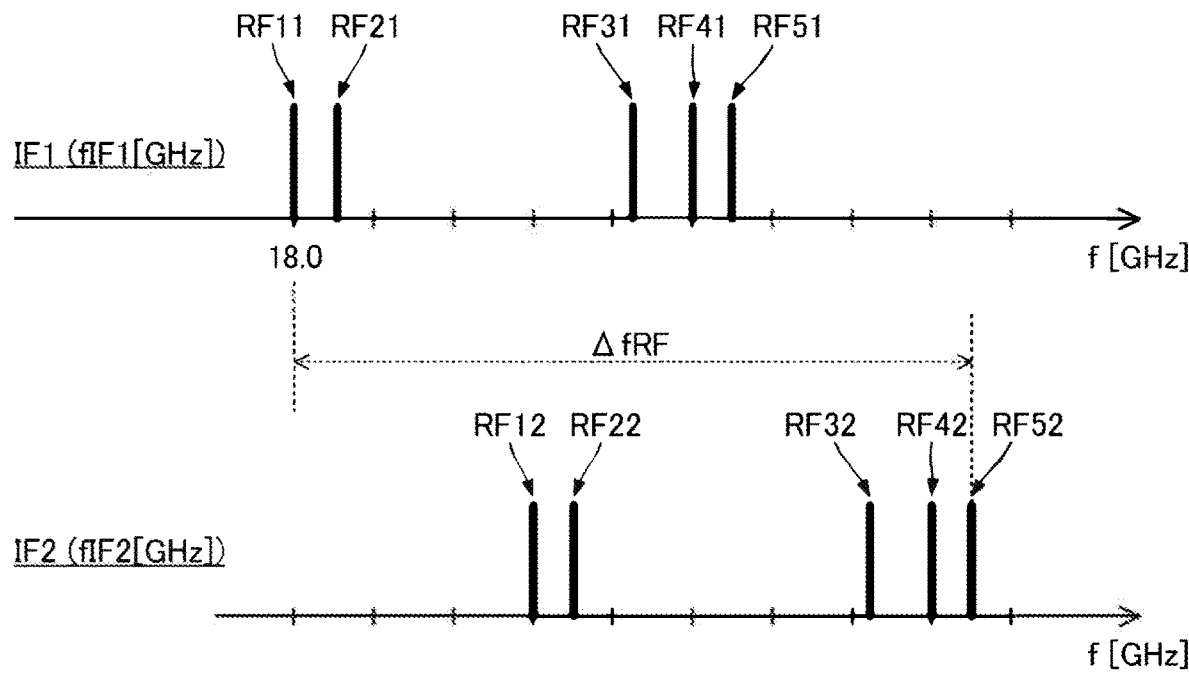
FIG. 4B shows a frequency distribution of the RF signal corresponding to a first intermediate frequency f(IF1) and a frequency distribution of the RF signal corresponding to a second intermediate frequency f(IF2)
Figure 4C:
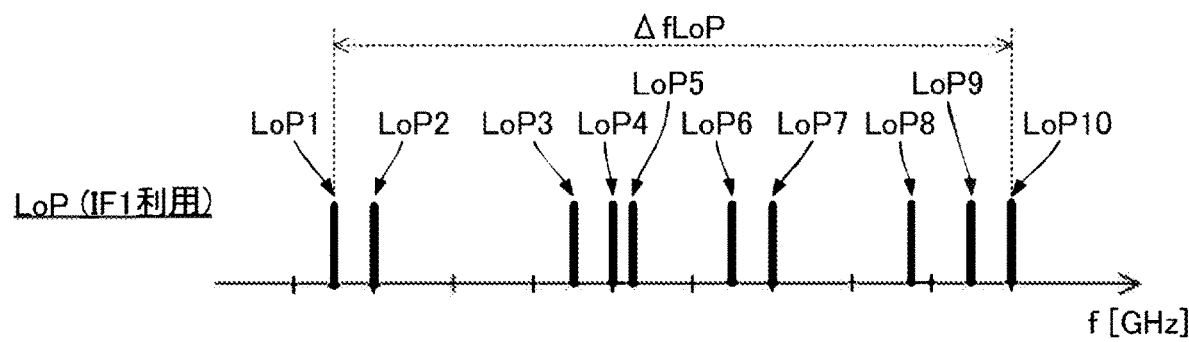
FIG. 4C shows a frequency distribution of the RF signal corresponding to an intermediate frequency in a conventional configuration.

FIG. 4A shows the frequency distribution of the local signal, FIG. 4B shows the frequency distribution of the RF signal corresponding to the first intermediate frequency f(IF1) and the frequency distribution of the RF signal corresponding to the second intermediate frequency f(IF2), and FIG. 4C shows the frequency distribution of the RF signal corresponding to an intermediate frequency in the conventional configuration.

As shown in FIGS. 3A and 4B, for example, the observation signal generation device 10 sets the first intermediate frequency f(IF1) to fIF1 [GHz] and sets the second intermediate frequency f(IF2) to fIF2 [GHz].

In this setting, for example, as shown in FIGS. 3A and 4A, the observation signal generation device 10 sets the local signal Lo1 to the frequency fLo [GHz]. In this case, the frequency of the RF signal (RF11 in FIG. 4B) corresponding to the first intermediate frequency f(IF1) (=fIF1 [GHz]) becomes fLo1−fIF1 [GHz]. On the other hand, the frequency of the RF signal (RF12 in FIG. 4B) corresponding to the second intermediate frequency f(IF2) (=fIF2 [GHz]) is fLo1+fIF2 [GHz].

Accordingly, the observation signal generation device 10 obtains a signal intensity of the RF signal of fLo1−fIF1 [GHz] by the first observation signal comprising the first intermediate frequency f(IF1). The observation signal generation device 10 obtains the signal intensity of the RF signal of fLo1+fIF2 [GHz] by the second observation signal of the second intermediate frequency f(IF2).

In this way, the observation signal generation device 10 can output the first observation signal and the second observation signal respectively reflecting the intensities of the RF signals of the two frequencies by the local signal Lo of the one frequency fLo. On the other hand, conventionally, as shown in FIG. 3B, in order to obtain the intensities of RF signals of two kinds of frequencies, local signals of two kinds of frequencies are used.

Furthermore, as shown in FIGS. 3A and 4A, by setting a plurality of kinds of frequencies of the local signal Lo, the observation signal generation device 10 can output, for each frequency of the local signal Lo, a first observation signal and a second observation signal respectively reflecting the intensities of RF signals of two kinds of frequencies.

For example, if the frequency of the local signal Lo2 is fLo2 [GHz], the first observation signal is a signal reflecting the intensity of the RF signal (RF21 in FIG. 4B) of fLo2−fIF1 [GHz], and the second observation signal is a signal reflecting the intensity of the RF signal (RF22 in FIG. 4B) of fLo2+fIF2 [GHz]. If the frequency of the local signal Lo3 is fLo3 [GHz], the first observation signal is a signal reflecting the intensity of the RF signal (RF31 in FIG. 4B) of fLo3−fIF1 [GHz], and the second observation signal is a signal reflecting the intensity of the RF signal (RF32 in FIG. 4B) of fLo3+fIF2 [GHz]. If the frequency of the local signal Lo4 is fLo4 [GHz], the first observation signal is a signal reflecting the intensity of the RF signal (RF41 in FIG. 4B) of fLo4−fIF1 [GHz], and the second observation signal is a signal reflecting the intensity of the RF signal (RF42 in FIG. 4B) of fLo4+fIF2 [GHz]. If the frequency of the local signal Lo5 is fLo5 [GHz], the first observation signal is a signal reflecting the intensity of the RF signal (RF51 in FIG. 4B) of fLo5−fIF1 [GHz], and the second observation signal is a signal reflecting the intensity of the RF signal (RF52 in FIG. 4B) of fLo5+fIF2 [GHz].

In this way, the observation signal generation device 10 can output observation signals reflecting the intensities of RF signals of 10 kinds of frequencies from the local signals Lo of 5 kinds of frequencies. On the other hand, in the conventional configuration, as shown in FIG. 3B, in order to obtain an observation signal that reflects the intensities of RF signals of 10 frequencies, local signals of 10 frequencies must be used. Therefore, the observation signal generation device 10 can obtain an observation signal corresponding to the frequency spectrum by simpler processing than the conventional one.

Further, as shown in FIGS. 4A and 4B, the observation signal generation device 10 can make a width ΔfLo of a frequency band for setting the local signal Lo smaller than a width ΔfRF of a frequency band of the RF signal to be observed (the frequency bandwidth of the frequency spectrum). On the other hand, in the conventional configuration, a width ΔfLoP of a frequency band for setting the local signal Lo is equal to the width ΔfRF of the frequency band of the RF signal to be observed.

Therefore, the observation signal generation device 10 can reduce the frequency bandwidth for setting the local signal Lo as compared with the conventional device.

Figure 5:
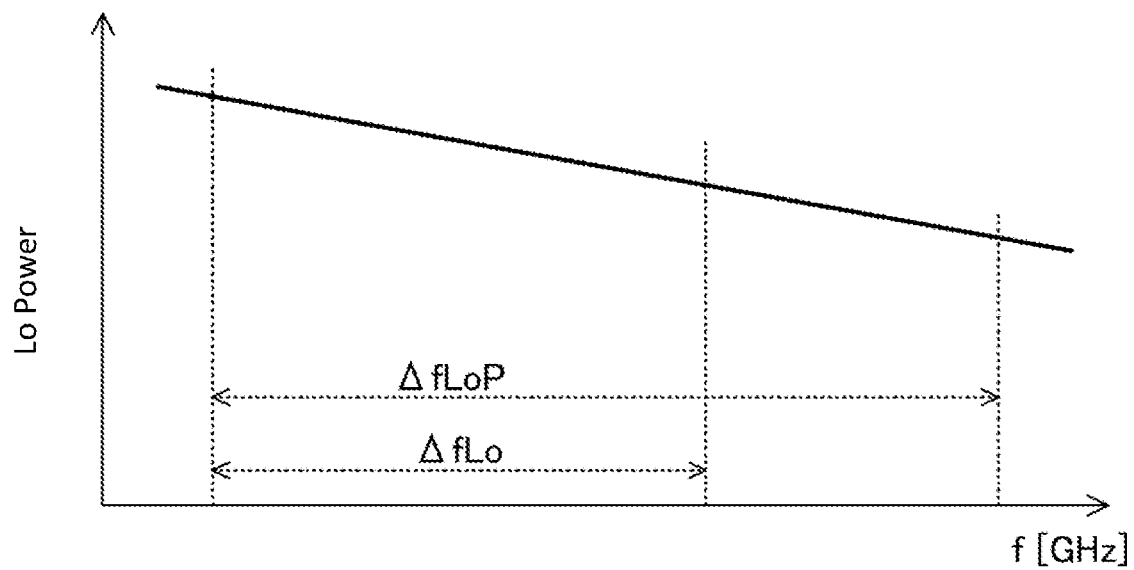
FIG. 5 is a graph illustrating an example of a frequency characteristic of the power of a local signal.

FIG. 5 is a graph showing an example of a frequency characteristic of power of the local signal. As shown in FIG. 5, the higher the frequency, the lower the power of the local signal. When a frequency spectrum is observed by using local signals of a plurality of kinds of frequencies, it is preferable that the difference in the intensity of each local signal is small. Therefore, it is preferable that the frequency sweep width of the local signal (the width of the frequency at which the local signals of a plurality of frequencies are set on the frequency axis) is smaller.

Here, as described above, by using the configuration of this embodiment, the observation signal generation device 10 can reduce a sweep width of the frequency of the local signal, and can generate and output an observation signal that reflects each intensity of the frequency spectrum with high accuracy. Further, since the sweep width of the frequency of the local signal becomes small, the observation time of the frequency spectrum becomes short.

Figure 6:
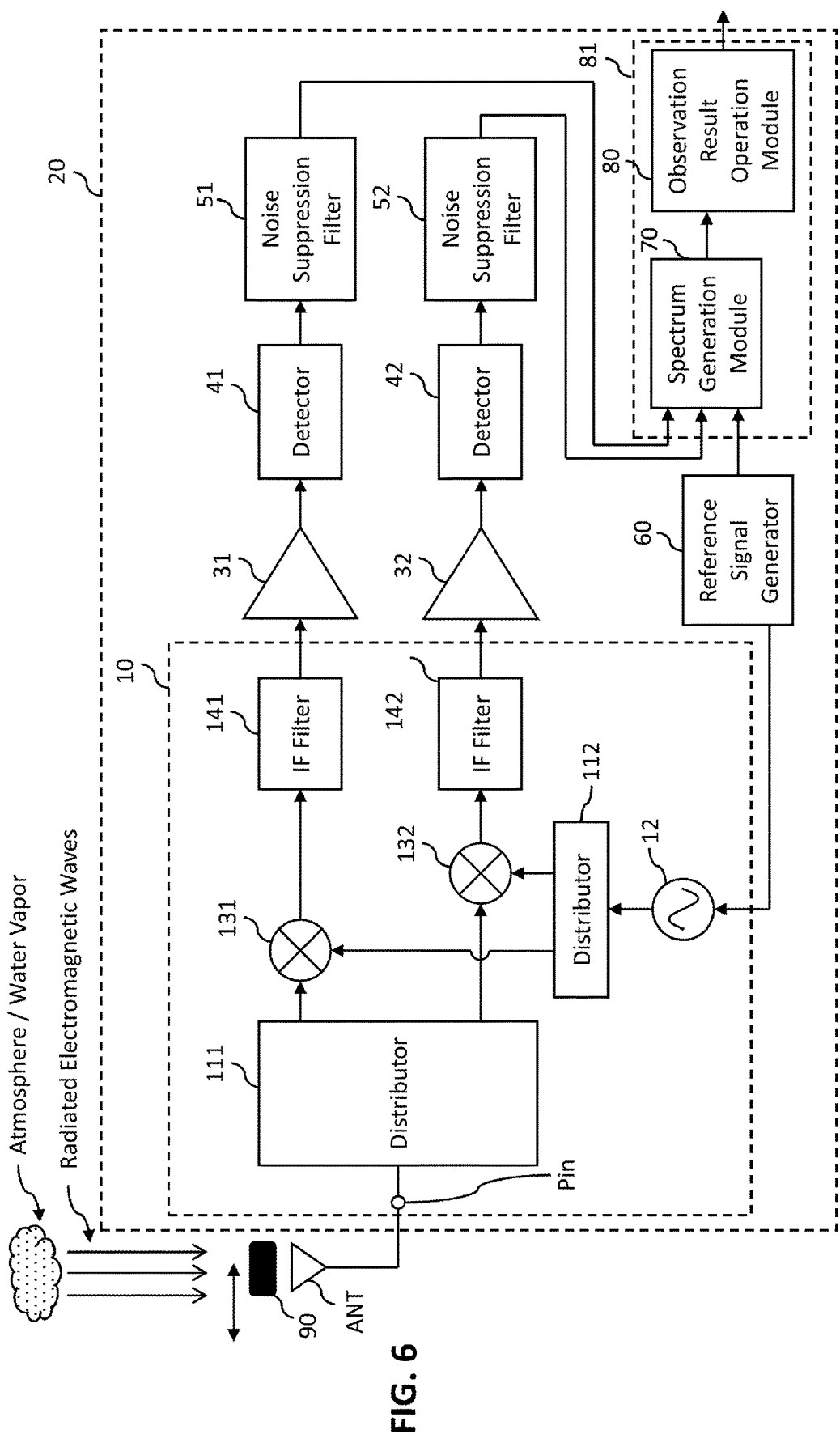
FIG. 6 is a block diagram showing a configuration of an observation device according to the first embodiment.

FIG. 6 is a block diagram showing a configuration of an observation device according to the first embodiment. As shown in FIG. 6, the observation device 20 includes the observation signal generation device 10, an amplifier 31, an amplifier 32, a detector 41, a detector 42, a noise suppression filter 51, a noise suppression filter 52, the reference signal generator 60, a spectrum generation module 70, and an observation result operation module 80. The amplifier 31, the amplifier 32, the detector 41, the detector 42, the noise suppression filter 51, the noise suppression filter 52, and the reference signal generator 60 are realized by, for example, a predetermined analog electronic circuit. The spectrum generation module 70 is realized by, for example, a predetermined electronic circuit or a digital processing arithmetic element. The observation result operation module 80 is implemented by, for example, an arithmetic element such as a CPU. A processing circuitry 81 includes the spectrum generation module 70 and the observation result operation module 80.

An input terminal of the amplifier 31 is connected to the IF filter 141 of the observation signal generation device 10, and an output terminal of the amplifier 31 is connected to an input terminal of the detector 41. An output terminal of the detector 41 is connected to the noise suppression filter 51, and the noise suppression filter 51 is connected to the spectrum generation module 70.

An input terminal of the amplifier 32 is connected to the IF filter 142 of the observation signal generation device 10, and an output terminal of the amplifier 32 is connected to an input terminal of the detector 42. An output terminal of the detector 42 is connected to the noise suppression filter 52, and the noise suppression filter 52 is connected to the spectrum generation module 70.

The spectrum generation module 70 is connected to the observation result operation module 80.

The amplifier 31 and the amplifier 32 are so-called LNA or the like. An amplification factor of the amplifier 31 and an amplification factor of the amplifier 32 are substantially the same. Here, "substantially the same" indicates a range in which the characteristics vary according to the specifications of the amplifier. The amplification factor of the amplifier 31 and the amplification factor of the amplifier 32 are preferably the same. The amplifier 31 amplifies the first observation signal and outputs the amplified signal to the detector 41. The amplifier 32 amplifies the second observation signal and outputs the amplified signal to the detector 42.

The detector 41 detects the first observation signal amplified by the amplifier 31 and outputs a first detection signal. The detector 42 detects the second observation signal amplified by the amplifier 32 and outputs a second detection signal. The detector 41 corresponds to a first detector of the present invention, and the detector 42 corresponds to a second detector of the present invention.

The noise suppression filter 51 and the noise suppression filter 52 are realized by, for example, a smoothing filter. The noise suppression filter 51 suppresses a noise component of the first detection signal and outputs it to the spectrum generation module 70. The noise suppression filter 52 suppresses a noise component of the second detection signal and outputs it to the spectrum generation module 70. Note that the noise suppression filter 51 and the noise suppression filter 52 can be omitted if the first detection signal and the second detection signal are direct current (DC).

The reference signal generator 60 generates a reference signal for frequency sweeping. The reference signal generator 60 outputs the reference signal to the local signal generator 12 and the spectrum generation module 70. The local signal generator 12 individually generates and outputs local signals of a plurality of kinds of frequencies based on the reference signal.

Figure 7:
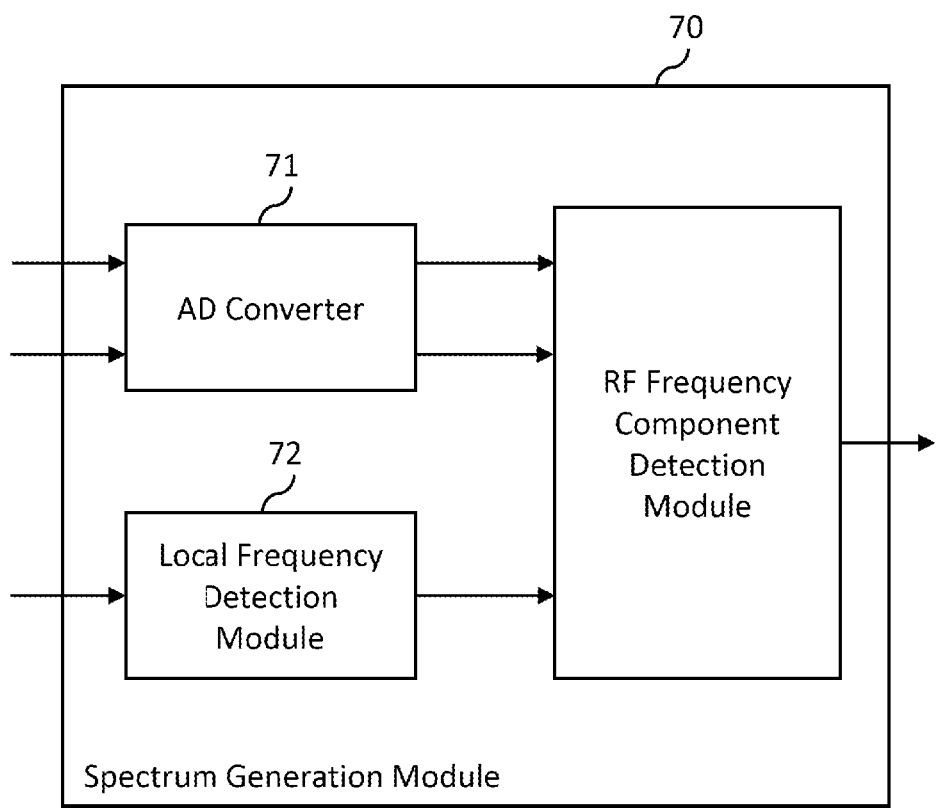
FIG. 7 is a block diagram showing a configuration of a spectrum generation module.

FIG. 7 is a block diagram showing a structure of the spectrum generation module 70. As shown in FIG. 7, the spectrum generation module 70 includes an AD converter 71, a local frequency detection module 72, and an RF frequency component detection module 73.

The AD converter 71 converts the first detection signal and the second detection signal from an analog signal to a digital signal and outputs them to the RF frequency component detection module 73.

The local frequency detection module 72 detects the frequency of the local signal from the reference signal. The local frequency detection module 72 outputs the frequency of the detected local signal to the RF frequency component detection module 73.

The RF frequency component detection module 73 stores the frequency of the local signal in association with the first detection signal and the second detection signal. The RF frequency component detection module 73 calculates the frequency of the RF signal corresponding to the first detection signal from the frequency of the local signal and a frequency of the first detection signal. Then, the spectrum generation module 70 sets a signal strength of the first detection signal as the signal strength of the RF signal of the calculated frequency.

The spectrum generation module 70 calculates the frequency of the RF signal corresponding to the second detection signal from the frequency of the local signal and a frequency of the second detection signal. Then, the spectrum generation module 70 sets a signal strength of the second detection signal as the signal strength of the RF signal of the calculated frequency.

The spectrum generation module 70 calculates a relationship between the signal strength and the frequency of these RF signals at each frequency of the local signal. The spectrum generation module 70 generates a relationship between signal strength and frequency of an RF signal of 1 sweep of a local signal as a frequency spectrum data. The spectrum generation module 70 outputs a frequency spectrum data to the observation result operation module 80.

The observation device 20 generates a frequency spectrum data in a state (reference state) in which the antenna ANT is blocked by a blackbody 90 and a state (observation state of an observation object) in which the antenna ANT is not blocked by the blackbody 90. That is, when the above-described processing is performed in a reference state, the frequency spectrum data outputted from the spectrum generation module 70 becomes the frequency spectrum data of the reference state. On the other hand, when the above-described processing is performed in an observation state of the observation object, the frequency spectrum data outputted from the spectrum generation module 70 becomes the frequency spectrum data of the observation state.

The frequency spectrum data in the reference state and the frequency spectrum data in the observation state are inputted to the observation result operation module 80. The observation result operation module 80 compares the frequency spectrum data of the reference state with the frequency spectrum data of the observation state. The observation result operation module 80 outputs the comparison result as an observation data (observation result) of the phenomenon of the observation object (Clouds, water vapor including rain, etc.).

Specifically, for example, the observation result operation module 80 differences an intensity of the frequency spectrum data in the reference state from an intensity of the frequency spectrum data in the observation state at each frequency to obtain the observation data of each frequency component.

As described above, the first observation signal and the second observation signal accurately reflect the respective intensities of the frequency spectra. Therefore, the observation result operation module 80 can calculate the observation data with high accuracy. Therefore, the observation device 20 can generate the observation data which highly accurately reflects the state of the phenomenon of the observation object.

In the above description, the modes in which the respective processes are implemented by the functional modules are described, but the respective processes described above are stored in a programmed state, and the functions of the observation signal generation device 10 described above may be implemented by executing the program by an arithmetic module such as a computer. The specific contents of the respective processes are described above, and the explanation thereof is omitted except for portions where additional explanation is considered necessary.

Figure 8:
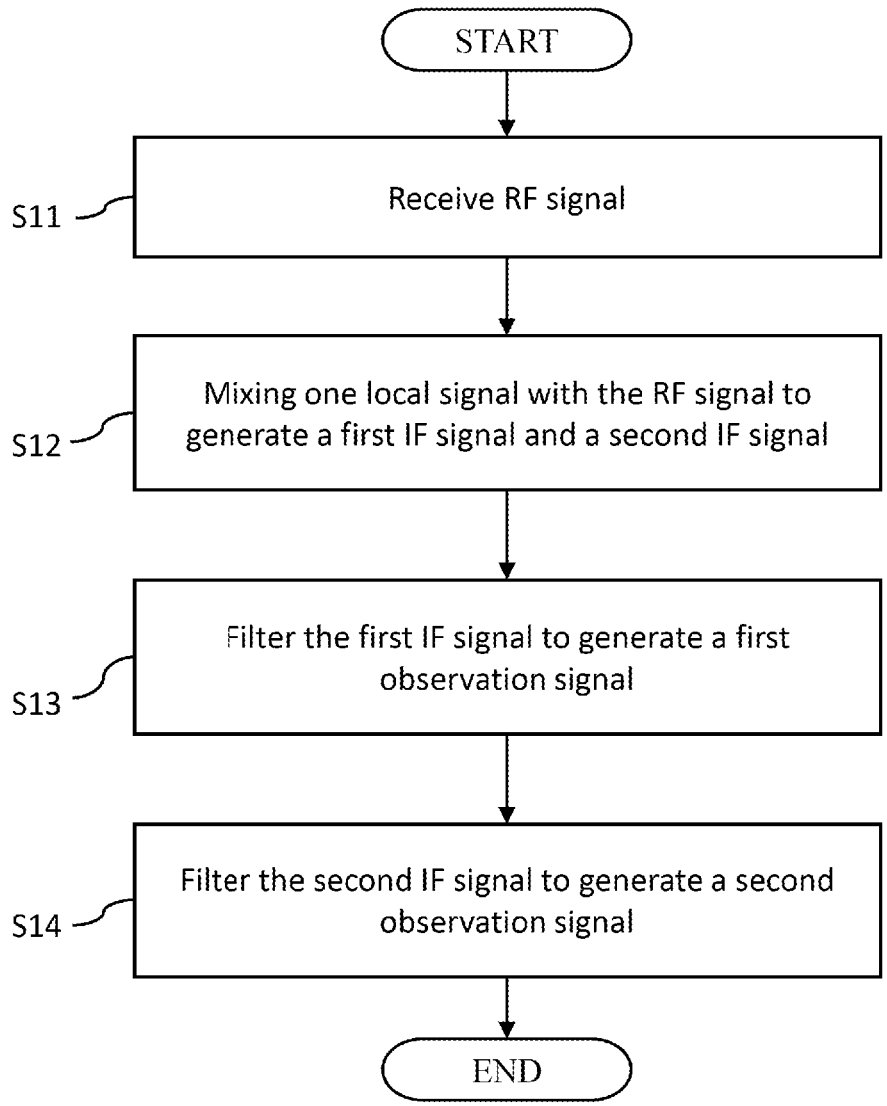
FIG. 8 is a flow chart showing a process of generating a plurality of IF signals from a local signal of one frequency according to the present embodiment.

FIG. 8 is a flow chart showing a process of generating a plurality of IF signals from a local signal of one frequency according to the present embodiment.

The arithmetic module receives an RF signal (S11). The arithmetic module mixes a local signal with the RF signal to generate a first IF signal and a second IF signal (S12).

The arithmetic module filters the first IF signal to generate a first observation signal (S13). The first observation signal has a frequency component obtained by subtracting a frequency of the RF signal from a frequency of the local signal.

The arithmetic module filters the second IF signal to generate a second observation signal (S14). The second observation signal has a frequency component obtained by subtracting the frequency of the local signal from the frequency of the RF signal.

Figure 9:
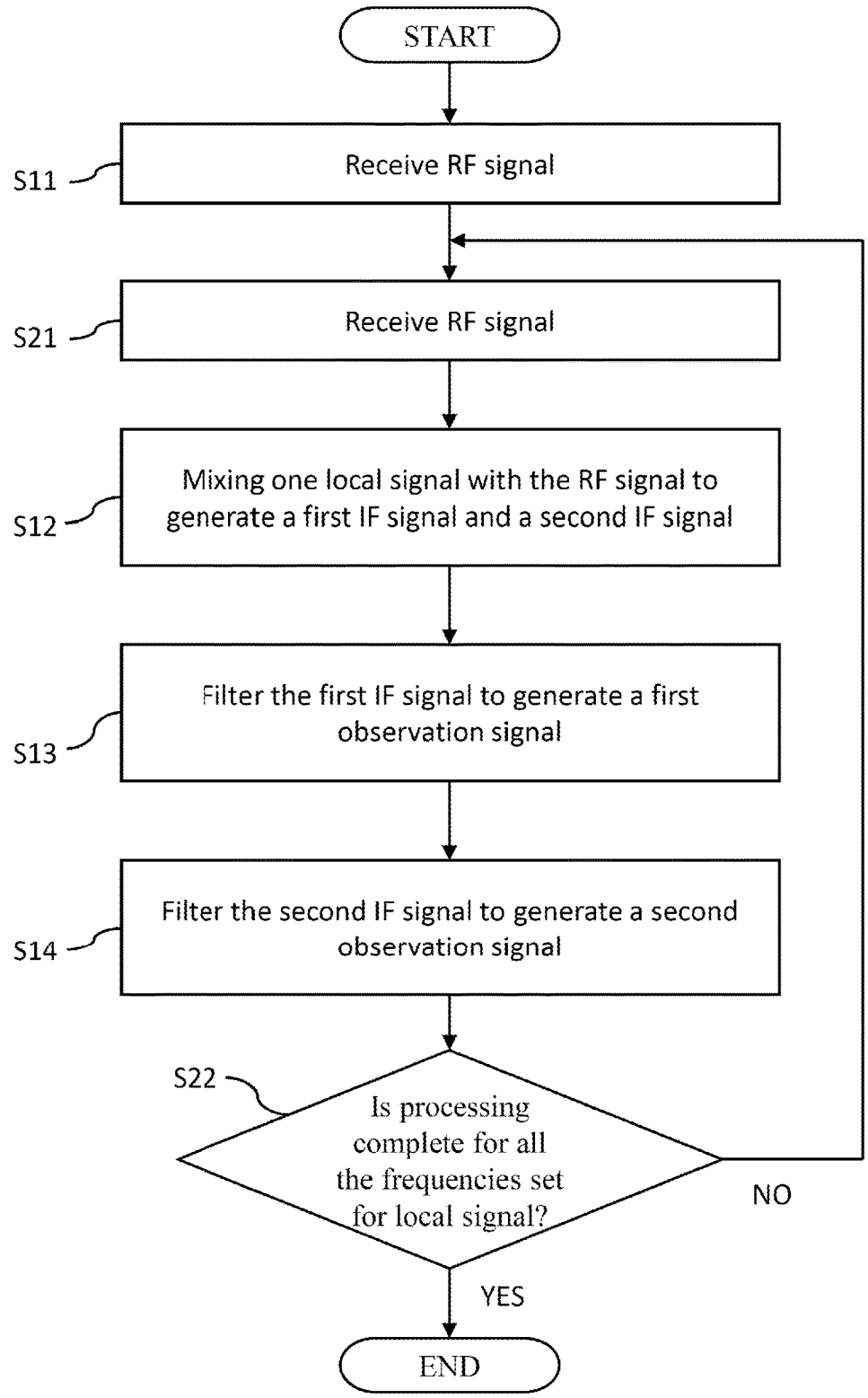
FIG. 9 is a flow chart showing a process of generating a plurality of IF signals from local signals of a plurality of kinds of frequencies according to the present embodiment.

FIG. 9 is a flow chart showing a process of generating a plurality of IF signals from local signals of a plurality of kinds of frequencies according to the present embodiment.

The arithmetic module receives the RF signal (S11). The arithmetic module sets the frequency of the local signal (S21). The arithmetic module mixes the local signal with the RF signal to generate a first IF signal and a second IF signal (S12).

The arithmetic module filters the first IF signal to generate a first observation signal (S13). The arithmetic module filters the second IF signal to generate a second observation signal (S14).

If the generation processing of the first observation signal and the second observation signal has not been completed for all the frequencies set in the local signal (S22: NO), the arithmetic module sets the local signal to another frequency (S21), and executes step S12, step S13, and step S14.

If the generation processing of the first observation signal and the second observation signal has been completed for all the frequencies set to the local signal (S22: YES), the arithmetic module ends the generation processing of the first observation signal and the second observation signal.

Figure 10:
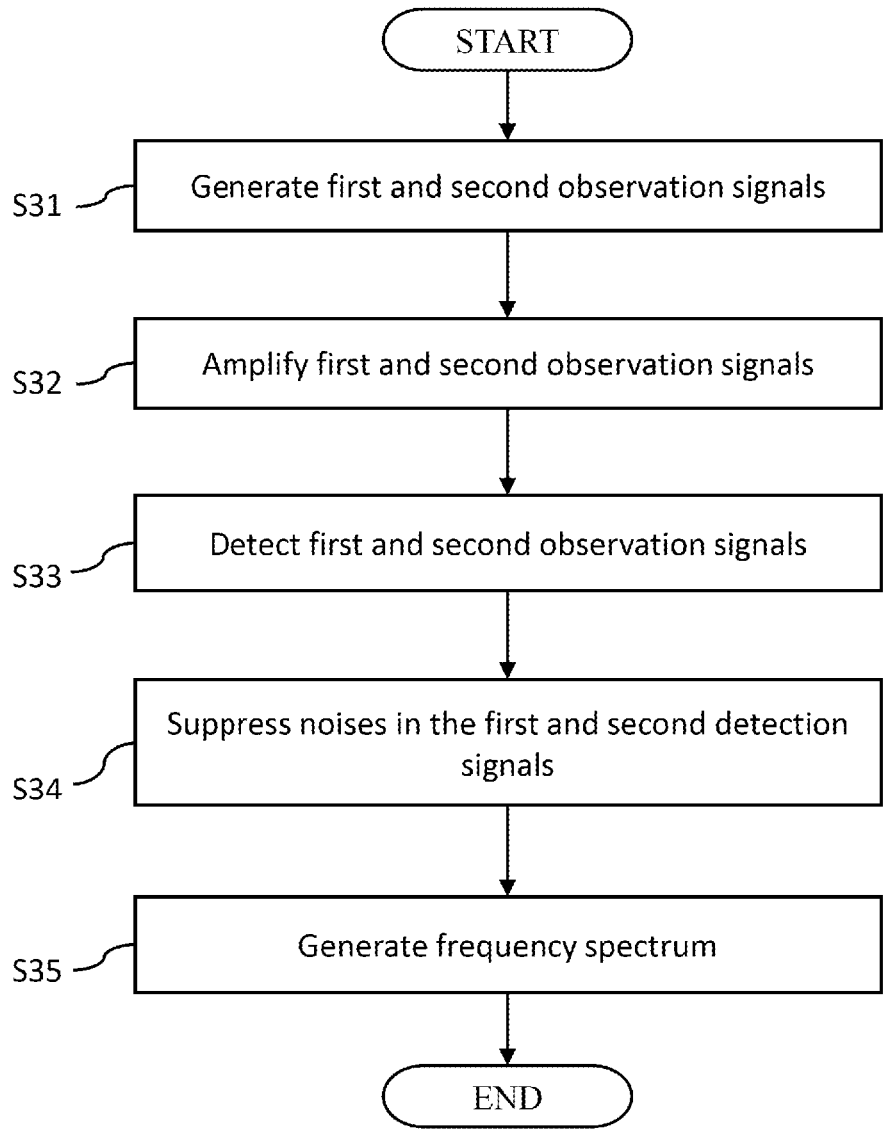
FIG. 10 is a flow chart showing a process for generating a frequency spectrum according to this embodiment.

FIG. 10 is a flow chart showing a process for generating a frequency spectrum according to the present embodiment.

The arithmetic module generates the first observation signal and the second observation signal by using the method shown in FIG. 8 (S31). The arithmetic module amplifies the first observation signal and the second observation signal (S32). An amplification factor for the first observation signal and an amplification factor for the second observation signal are substantially the same. Here, "substantially the same" indicates a range in which the characteristics vary according to the specifications of the electronic component to be amplified. The amplification factor for the first observation signal and the amplification factor for the second observation signal are preferably the same.

The arithmetic module detects the first observation signal, outputs a first detection signal, detects the second observation signal, and outputs a second detection signal (S33). The arithmetic module suppresses noises of the first detection signal and the second detection signal (S34). The arithmetic module generates the frequency spectrum first from the strength of the second detection signal and the strength of the data detection signal with respect to local signals of a plurality of kinds of frequencies (S35).

Figure 11:
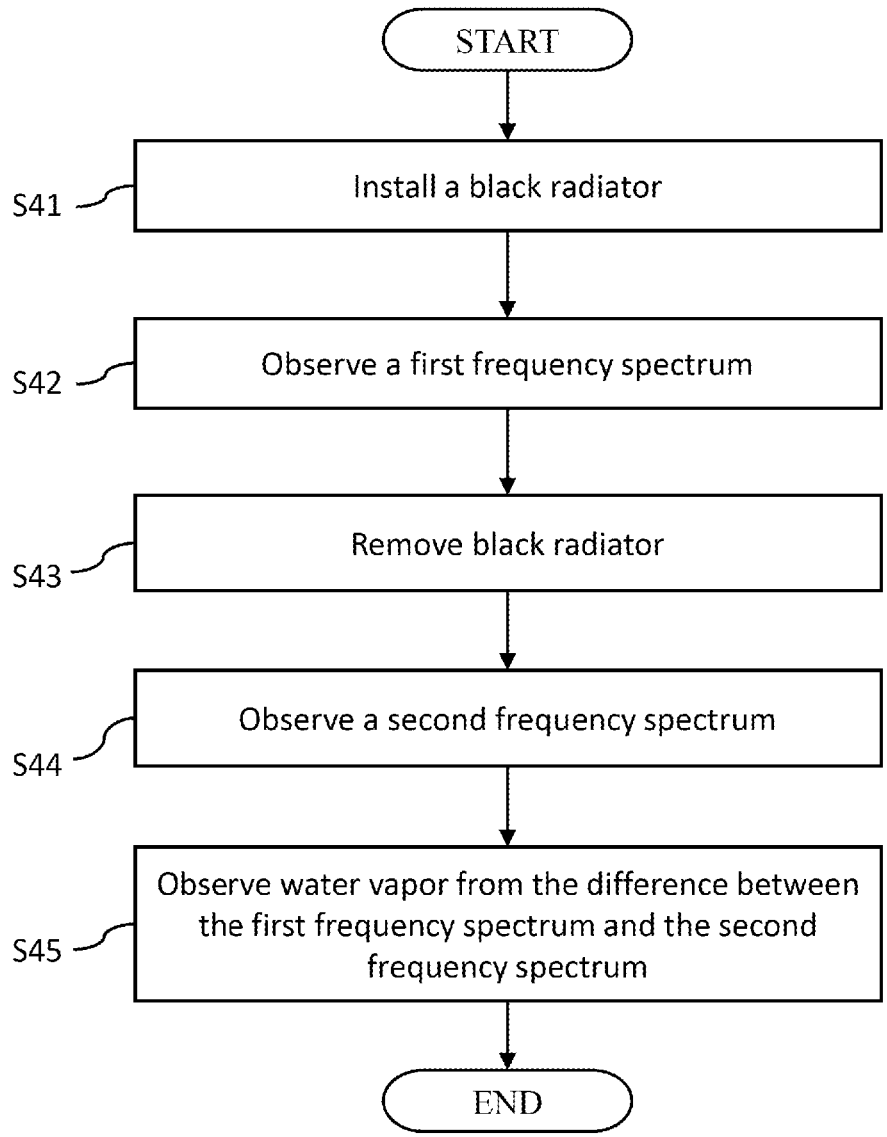
FIG. 11 is a flow chart showing a method of generating a water vapor observation data according to the present embodiment.

FIG. 11 is a flow chart showing a method of generating a water vapor observation data according to the present embodiment.

In a state where the blackbody 90 is installed on a receiving surface of the antenna ANT (S41), the arithmetic module observes the frequency spectrum (first frequency spectrum) using the method described above (S42). That is, the arithmetic module generates a first frequency spectrum data.

In a state where the blackbody 90 is removed from the wave receiving surface of the antenna ANT (S43), the arithmetic module observes the frequency spectrum (second frequency spectrum) using the above-described method (S44).

The arithmetic module observes water vapor from the difference in intensity between the first frequency spectrum and the second frequency spectrum (S45). That is, the computing device generates an observation data of water vapor.

Figure 12:
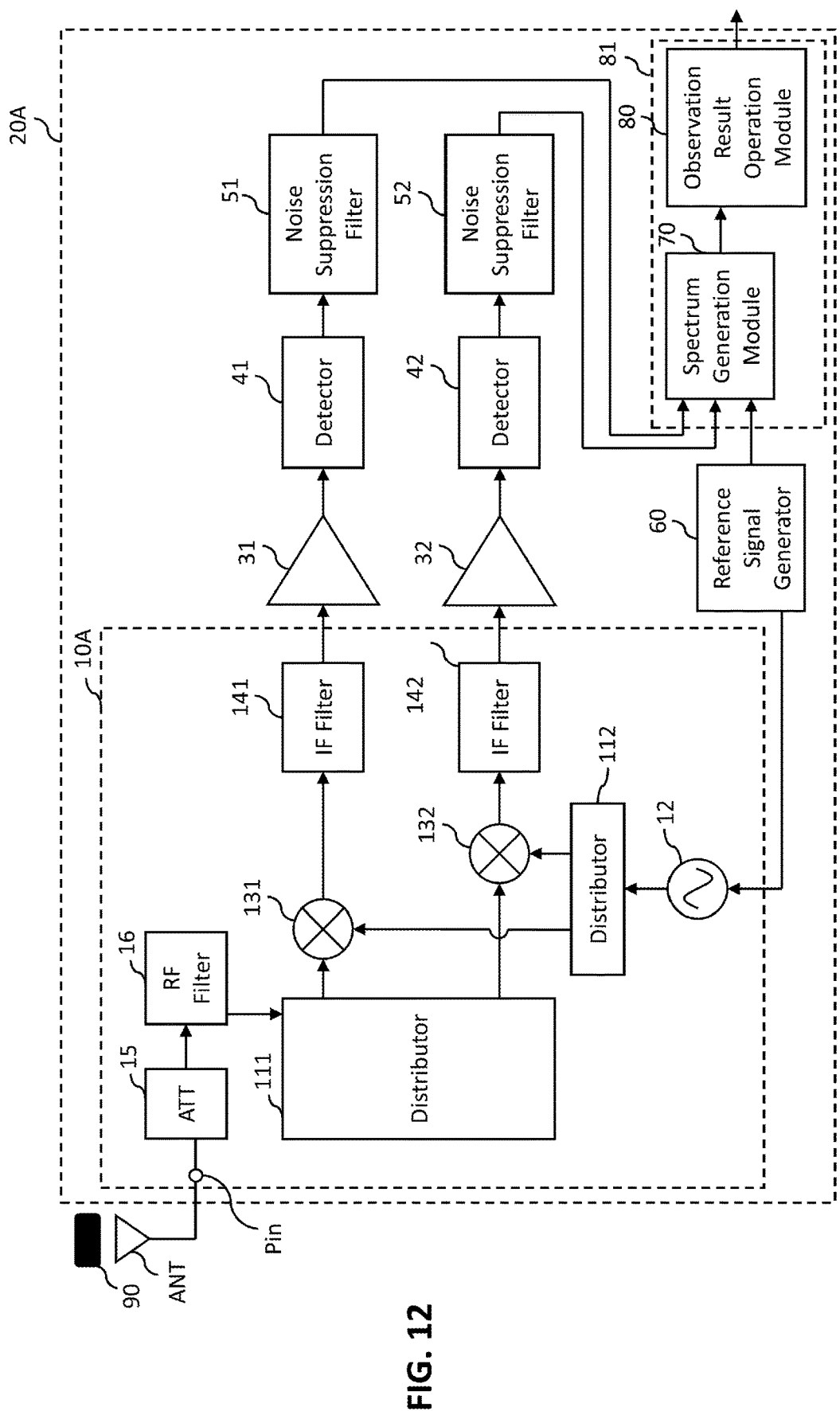
FIG. 12 is a block diagram showing a configuration of an observation signal generation device and an observation device according to a second embodiment.

An observation signal generation device, an observation device, an observation signal generating method, and an observation method according to a second embodiment of the present invention will be described with reference to the drawings. FIG. 12 is a block diagram showing the configuration of an observation signal generation device 10A and an observation device 20A according to a second embodiment.

As shown in FIG. 12, the observation device 20A according to the second embodiment differs from the observation device 20 according to the embodiment of the first in the configuration of the observation signal generation device 10A. The other components of the observation device 20A are the same as those of the observation device 20, and the description of the same parts will be omitted.

The observation device 20A includes an observation signal generation device 10A. The observation signal generation device 10A differs from the observation signal generation device 10 according to the first embodiment in that an attenuator (ATT) 15 and an RF filter 16 are added thereto. The other components of the observation signal generation device 10A are the same as those of the observation signal generation device 10, and the description of the same parts will be omitted.

The attenuator 15 and the RF filter 16 are connected in series between the input terminal Pin and the distributor 111. When the input terminal Pin is not physically provided, the attenuator 15 is directly connected to the antenna ANT or the first stage LNA.

The attenuator 15 attenuates the RF signal input from the input terminal Pin by a predetermined attenuation amount. Thus, signal distortion due to the intensity of the first observation signal and the intensity of the second observation signal being too high can be suppressed. Therefore, the observation device 20A can obtain a highly accurate frequency spectrum data.

The RF filter 16 limits the frequency band of the RF signal. For example, the passband and attenuation band of the RF filter 16 are set in accordance with a frequency band of a spectrum occurring in a phenomenon to be observed. Specifically, the passband of the RF filter 16 includes a frequency band of a spectrum occurring in a phenomenon to be observed, and is set to substantially the same frequency band. The attenuation band of the RF filter 16 is set to a frequency range other than the passband set as described above. Thus, by using the RF filter 16, noise with respect to the frequency spectrum of the phenomenon to be observed is suppressed even at the stage of the RF signal. Therefore, the observation device 20A can obtain a highly accurate frequency spectrum data. The mixer 131 and the mixer 132 are implemented by an IQ mixer, whereby the RF filter 16 can be omitted.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An observation signal generation device, comprising:
a local signal generator configured to generate a local signal;
a first mixer configured to mix a radio frequency (RF) signal of an observation object having a plurality of frequency components with the local signal, and output a first intermediate frequency (IF) signal;
a second mixer configured to mix the RF signal with the local signal, and output a second IF signal;
a first IF filter configured to:
include, in a passband, a first intermediate frequency obtained by subtracting a first frequency of the plurality of frequency components of the RF signal from a frequency of the local signal;
include, in an attenuation band, a second intermediate frequency obtained by subtracting the frequency of the local signal from a second frequency of the plurality of frequency components of the RF signal different from the first frequency; and
filter the first IF signal to generate a first observation signal; and
a second IF filter configured to:
include the first intermediate frequency in the attenuation band;
include the second intermediate frequency in the passband; and
filter the second IF signal to generate a second observation signal, wherein the local signal generator individually generates local signals of a plurality of frequencies at respective different timings, which are equally distributed to the first mixer and the second mixer by a distributor.

2. The observation signal generation device according to claim 1, further comprising:
an RF filter configured to limit a frequency band of the RF signal.

3. The observation signal generation device according to claim 1, further comprising:
an RF attenuator configured to limit an amplitude of the RF signal.

4. An observation device comprising the observation signal generation device according to claim 1, the observation device further comprising:
a first detector configured to detect the first observation signal and output a first detection signal;
a second detector configured to detect the second observation signal and outputting a second detection signal; and
a processing circuitry configured to:
generate a frequency spectrum of the RF signal of the observation object from the first detection signal and the second detection signal.

5. The observation device according to claim 4, further comprising:
an amplifier configured to amplify the first observation signal and the second observation signal at the same amplification factor.

6. The observation device according to claim 4, further comprising:
a noise suppression filter configured to suppress a noise component of the first detection signal and the second detection signal.

7. An observation signal generation method, comprising:
generating a local signal;
at a first mixer, mixing a radio frequency (RF) signal of an observation object having a plurality of frequency components with the local signal, and outputting a first intermediate frequency (IF) signal;
at a second mixer, mixing the RF signal with the local signal, and outputting a second IF signal;
filtering the first IF signal to generate a first observation signal, wherein a first intermediate frequency obtained by subtracting a first frequency of the RF signal from a frequency of the local signal is included in a passband, and a second intermediate frequency obtained by subtracting the frequency of the local signal from a second frequency of the RF signal different from the first frequency is included in an attenuation band;
filtering the second IF signal to generate a second observation signal, wherein the first intermediate frequency is included in the attenuation band, and the second intermediate frequency is included in the passband; and
generating individual local signals of a plurality of frequencies at respective different timings, which are equally distributed to the first mixer and the second mixer by a distributor.

8. An observation method including the observation signal generation method according to claim 7, further comprising:
detecting the first observation signal and outputting a first detection signal;
detecting the second observation signal and outputting a second detection signal; and
generating a frequency spectrum of the RF signal of the observation object from the first detection signal and the second detection signal.

9. The observation signal generation method according to claim 8, further comprising:
amplifying the first observation signal and the second observation signal at the same amplification factor.

10. The observation signal generation method according to claim 8, further comprising:
suppressing a noise component of the first detection signal and the second detection signal.

11. The observation signal generation method according to claim 7, further comprising:
limiting a frequency band of the RF signal.

12. The observation signal generation method according to claim 7, further comprising:
limiting an amplitude of the RF signal.

13. A non-transitory computer-readable medium having stored thereon computer-executable instructions which, when executed by a computer, cause the computer to:
generate a local signal;
at a first mixer, mix a radio frequency (RF) signal of an observation object having a plurality of frequency components with the local signal, and output a first intermediate frequency (IF) signal;

at a second mixer, mix the RF signal with the local signal, and output a second IF signal;

filter the first IF signal to generate a first observation signal, wherein a first intermediate frequency obtained by subtracting a first frequency of the RF signal from a frequency of the local signal, is included in a passband, and a second intermediate frequency obtained by subtracting the frequency of the local signal from a second frequency of the RF signal different from the first frequency, is included in an attenuation band;

filter the second IF signal to generate a second observation signal, wherein the first intermediate frequency in the attenuation band, and the second intermediate frequency in the passband; and generate individual local signals of a plurality of frequencies at respective different timings, which are equally distributed to the first mixer and the second mixer by a distributor.

14. The non-transitory computer-readable medium according to claim 13, further causing the computer to:

detect the first observation signal and output a first detection signal;

detect the second observation signal and output a second detection signal; and generate a frequency spectrum of the RF signal of the observation object from the first detection signal and the second detection signal.

15. The non-transitory computer-readable medium according to claim 14, further causing the computer to:

amplify the first observation signal and the second observation signal at the same amplification factor.

16. The non-transitory computer-readable medium according to claim 14, further causing the computer to:

suppress a noise component of the first detection signal and the second detection signal.

17. The non-transitory computer-readable medium according to claim 13, further causing the computer to:

limit a frequency band of the RF signal.

18. The non-transitory computer-readable medium according to claim 13, further causing the computer to:

limit an amplitude of the RF signal.

* * * * *